US012078954B2

(12) United States Patent
Payne et al.

(10) Patent No.: US 12,078,954 B2
(45) **Date of Patent: *Sep. 3, 2024**

(54) REPLACEABLE UNIT FOR AN ELECTROPHOTOGRAPHIC IMAGE FORMING DEVICE HAVING POSITIONING FEATURES FOR ELECTRICAL CONTACTS

(71) Applicant: LEXMARK INTERNATIONAL, INC., Lexington, KY (US)

(72) Inventors: Jeremy Keith Payne, Georgetown, KY (US); Edward Lynn Triplett, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/139,640

(22) Filed: Apr. 26, 2023

(65) Prior Publication Data

US 2023/0259066 A1 Aug. 17, 2023

Related U.S. Application Data

(63) Continuation of application No. 17/691,298, filed on Mar. 10, 2022, now Pat. No. 11,669,040, which is a (Continued)

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.

CPC ..... *G03G 21/1652* (2013.01); *G03G 15/0863* (2013.01); *G03G 15/0865* (2013.01); (Continued)

(58) Field of Classification Search

CPC ........... G03G 21/1652; G03G 15/0865; G03G 21/1821; G03G 15/0877; G03G 15/0863; (Continued)

(56) References Cited

U.S. PATENT DOCUMENTS 5,997,329 A * 12/1999 Kosmala ............ H01R 13/6273 439/329

8,879,953 B2 * 11/2014 Amann .............. G03G 15/0863 399/90

(Continued)

*Primary Examiner* — Ryan D Walsh

(74) *Attorney, Agent, or Firm* — Justin M. Tromp

(57) ABSTRACT

A replaceable unit for an electrophotographic image forming device according to one example embodiment includes an electrical contact positioned on a first side of a housing of the replaceable unit for contacting an electrical contact in the image forming device. A guide on the first side of the housing is positioned closer to a front of the housing than the electrical contact and leads rearward toward the electrical contact. The guide includes an inside surface that faces inward sideways toward a second side of the housing. At least a portion of the inside surface is angled inward sideways from front to rear permitting contact between the inside surface and an electrical connector in the image forming device to draw the electrical connector in the image forming device inward sideways relative to the replaceable unit during insertion of the replaceable unit into the image forming device.

6 Claims, 11 Drawing Sheets

Related U.S. Application Data continuation of application No. 17/098,984, filed on Nov. 16, 2020, now Pat. No. 11,300,921, which is a continuation of application No. 16/688,092, filed on Nov. 19, 2019, now Pat. No. 10,871,742, which is a continuation of application No. 16/249,009, filed on Jan. 16, 2019, now Pat. No. 10,488,812, which is a continuation of application No. 15/285,932, filed on Oct. 5, 2016, now Pat. No. 10,222,738, which is a continuation of application No. 15/138,380, filed on Apr. 26, 2016, now Pat. No. 9,482,989, which is a continuation of application No. 14/854,298, filed on Sep. 15, 2015, now Pat. No. 9,360,834.

(52) U.S. Cl.
CPC ..... *G03G 15/0877* (2013.01); *G03G 21/1821* (2013.01); *G03G 21/1867* (2013.01); *G03G 21/1871* (2013.01); *G03G 2221/166* (2013.01)

(58) Field of Classification Search
CPC ........... G03G 21/1867; G03G 21/1871; G03G 2221/166
See application file for complete search history.

(56) References Cited

U.S. PATENT DOCUMENTS

| | | | | | |
|---|---|---|---|---|---|
| 9,360,834 | B1 * | 6/2016 | Payne | G03G 15/0877 | |
| 9,482,989 | B1 * | 11/2016 | Payne | G03G 15/0877 | |
| 10,222,738 | B2 * | 3/2019 | Payne | G03G 21/1867 | |
| 10,488,812 | B2 * | 11/2019 | Payne | G03G 15/0865 | |
| 10,871,742 | B2 * | 12/2020 | Payne | G03G 21/1821 | |
| 11,300,921 | B2 * | 4/2022 | Payne | G03G 15/0865 | |
| 2001/0014225 | A1 * | 8/2001 | Otsubo | H01R 13/665 | 399/24 |
| 2004/0077197 | A1 * | 4/2004 | Nishide | H01R 13/73 | 439/157 |
| 2008/0317510 | A1 * | 12/2008 | Choi | G03G 15/0872 | 399/262 |
| 2009/0142103 | A1 * | 6/2009 | Chaudhuri | G03G 15/0875 | 399/262 |
| 2013/0170868 | A1 * | 7/2013 | Acosta | G03G 15/0886 | 399/258 |
| 2013/0343777 | A1 * | 12/2013 | Amann | G03G 15/0865 | 399/258 |

* cited by examiner

REPLACEABLE UNIT FOR AN ELECTROPHOTOGRAPHIC IMAGE FORMING DEVICE HAVING POSITIONING FEATURES FOR ELECTRICAL CONTACTS

CROSS REFERENCES TO RELATED APPLICATIONS

This patent application is a continuation application of U.S. patent application Ser. No. 17/691,298, filed Mar. 10, 2022, entitled "Replaceable Unit for an Electrophotographic Image Forming Device Having Positioning Features for Electrical Contacts," which is a continuation application of U.S. patent application Ser. No. 17/098,984, filed Nov. 16, 2020, now U.S. Pat. No. 11,300,921, issued Apr. 12, 2022, entitled "Replaceable Unit for an Electrophotographic Image Forming Device Having Positioning Features for Electrical Contacts," which is a continuation application of U.S. patent application Ser. No. 16/688,092, filed Nov. 19, 2019, now U.S. Pat. No. 10,871,742, issued Dec. 22, 2020, entitled "Electrophotographic Image Forming Device Having a Replaceable Unit With Positioning Features for Electrical Contacts," which is a continuation application of U.S. patent application Ser. No. 16/249,009, filed Jan. 16, 2019, now U.S. Pat. No. 10,488,812, issued Nov. 26, 2019, entitled "Replaceable Unit for an Electrophotographic Image Forming Device Having Positioning Features for Electrical Contacts," which is a continuation application of U.S. patent application Ser. No. 15/285,932, filed Oct. 5, 2016, now U.S. Pat. No. 10,222,738, issued Mar. 5, 2019, entitled "Replaceable Unit for an Electrophotographic Image Forming Device Having Positioning Features for Electrical Contacts," which is a continuation application of U.S. patent application Ser. No. 15/138,380, filed Apr. 26, 2016, now U.S. Pat. No. 9,482,989, issued Nov. 1, 2016, entitled "Replaceable Unit for an Electrophotographic Image Forming Device Having Positioning Features for Electrical Contacts," which is a continuation application of U.S. patent application Ser. No. 14/854,298, filed Sep. 15, 2015, now U.S. Pat. No. 9,360,834, issued Jun. 7, 2016, entitled "Replaceable Unit for an Electrophotographic Image Forming Device Having Positioning Features for Electrical Contacts."

BACKGROUND

1. Field of the Disclosure

The present disclosure relates generally to image forming devices and more particularly to a replaceable unit for an electrophotographic image forming device having positioning features for electrical contacts.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units that have a shorter lifespan than the image forming device. It is desired to communicate various operating parameters and usage information of the replaceable unit(s) to the image forming device for proper operation. For example, it may be desired to communicate such information as replaceable unit serial number, replaceable unit type, toner color, toner capacity, amount of toner remaining, license information, etc. The replaceable unit(s) typically include processing circuitry configured to communicate with and respond to commands from a controller in the image forming device. The replaceable unit(s) also include memory associated with the processing circuitry that stores program instructions and information related to the replaceable unit. The processing circuitry and associated memory are typically mounted on a circuit board that is attached to the replaceable unit. The replaceable unit also includes one or more electrical contacts that mate with corresponding electrical contacts in the image forming device upon installation of the replaceable unit in the image forming device in order to facilitate communication between the processing circuitry of the replaceable unit and the controller of the image forming device. It is important to accurately position the electrical contacts of the replaceable unit relative to the corresponding electrical contacts of the image forming device in order to ensure a reliable connection between the processing circuitry of the replaceable unit and the controller of the image forming device when the replaceable unit is installed in the image forming device.

Accordingly, positioning features that provide precise alignment of the electrical contacts of the replaceable unit with corresponding electrical contacts of the image forming device are desired.

SUMMARY

A replaceable unit for an electrophotographic image forming device according to one example embodiment includes a housing having a top, a bottom, a front, and a rear positioned between a first side and a second side of the housing. The housing has a reservoir for holding toner. An electrical contact is positioned on the first side of the housing for contacting a corresponding electrical contact in the image forming device when the replaceable unit is installed in the image forming device. A guide on the first side of the housing is positioned closer to the front of the housing than the electrical contact and leads rearward toward the electrical contact. The guide includes an inside surface that faces inward sideways toward the second side of the housing. The inside surface is unobstructed permitting the inside surface to contact an electrical connector in the image forming device during insertion of the replaceable unit into the image forming device. At least a portion of the inside surface is angled inward sideways in a direction from the front to the rear permitting contact between the inside surface and the electrical connector in the image forming device to draw the electrical connector in the image forming device inward sideways relative to the replaceable unit during insertion of the replaceable unit into the image forming device with the front of the housing leading.

In some embodiments, the electrical contact is positioned within a pocket on the first side of the housing. The pocket includes a frontward facing opening permitting the electrical connector in the image forming device to enter the pocket when the replaceable unit is installed in the image forming device. In some embodiments, the guide includes a first guide and a second guide. The first guide is spaced above the second guide with a gap between the first guide and the second guide. The inside surface includes a first inside surface on the first guide and a second inside surface on the second guide. Some embodiments include a vertical guide on the first side of the housing positioned closer to the front of the housing than the electrical contact and leading rearward toward the electrical contact. The vertical guide is unobstructed permitting the vertical guide to contact the electrical connector in the image forming device during insertion of the replaceable unit into the image forming device. In some embodiments, the vertical guide includes a top guide and a bottom guide. The top guide is spaced above the bottom guide with a gap between the top guide and the bottom guide. The top guide includes a bottom surface that faces a top surface of the bottom guide. The bottom surface of the top guide and the top surface of the bottom guide are unobstructed permitting the bottom surface of the top guide and the top surface of the bottom guide to contact the electrical connector in the image forming device during insertion of the replaceable unit into the image forming device. In some embodiments, at least a portion of the bottom surface of the top guide is angled downward in the direction from the front to the rear and at least a portion of the top surface of the bottom guide is angled upward in the direction from the front to the rear permitting contact between the bottom surface of the top guide and the electrical connector in the image forming device and between the top surface of the bottom guide and the electrical connector in the image forming device to align the electrical connector in the image forming device vertically during insertion of the replaceable unit into the image forming device.

A replaceable unit for an electrophotographic image forming device according to another example embodiment includes a housing having a top, a bottom, a front, and a rear positioned between a first side and a second side of the housing. The housing has a reservoir for holding toner. An electrical contact is positioned on the first side of the housing for contacting a corresponding electrical contact in the image forming device when the replaceable unit is installed in the image forming device. The electrical contact is electrically connected to processing circuitry mounted on the housing. A first and a second guide are positioned on the first side of the housing. Each of the first and second guides is positioned closer to the front of the housing than the electrical contact and leads rearward toward the electrical contact. The first guide is spaced above the second guide with a gap between the first guide and the second guide. The first guide includes a first inside surface and the second guide includes a second inside surface. The first and second inside surfaces face inward sideways toward an outer side surface of the first side of the housing. The first and second inside surfaces are spaced outward sideways from the outer side surface of the first side of the housing with a gap between each of the first and second inside surfaces and the outer side surface of the first side of the housing. At least a portion of each of the first and second inside surfaces is angled inward sideways in a direction from the front to the rear.

In some embodiments, the electrical contact is positioned within a pocket on the first side of the housing. The pocket includes a frontward facing opening permitting the electrical connector in the image forming device to enter the pocket when the replaceable unit is installed in the image forming device. Some embodiments include a top vertical guide and a bottom vertical guide on the first side of the housing each positioned closer to the front of the housing than the electrical contact and leading rearward toward the electrical contact. The top vertical guide is spaced above the bottom vertical guide with a gap between the top vertical guide and the bottom vertical guide. The top vertical guide includes a bottom surface that faces a top surface of the bottom vertical guide. In some embodiments, at least a portion of the bottom surface of the top vertical guide is angled downward in the direction from the front to the rear and at least a portion of the top surface of the bottom vertical guide is angled upward in the direction from the front to the rear.

A toner cartridge according to one example embodiment includes a housing having a top, a bottom, a front, and a rear positioned between a first side and a second side of the housing. The housing has a reservoir for holding toner. An outlet port is in fluid communication with the reservoir and faces downward on the front of the housing for exiting toner from the toner cartridge. A channel runs along the front of the housing between the first side and the second side and is in fluid communication with the outlet port. At least a portion of the channel is open to the reservoir. An auger is positioned in the channel and extends along the front of the housing between the first side and the second side. The auger includes a rotational axis and is operative to move toner in the channel toward the outlet port. An electrical contact is positioned on the first side of the housing for contacting a corresponding electrical contact in the image forming device when the toner cartridge is installed in the image forming device. The electrical contact is electrically connected to processing circuitry mounted on the housing. A guide on the first side of the housing is positioned in front of and leads rearward toward the electrical contact. The guide includes an inside surface that faces axially inward relative to the rotational axis of the auger. The inside surface is unobstructed permitting the inside surface to contact an electrical connector in the image forming device during insertion of the toner cartridge into the image forming device. At least a portion of the inside surface is angled axially inward relative to the rotational axis of the auger in a direction from the front to the rear permitting contact between the inside surface and the electrical connector in the image forming device to draw the electrical connector in the image forming device axially inward relative to the rotational axis of the auger during insertion of the toner cartridge into the image forming device with the front of the housing leading.

In some embodiments, the electrical contact is positioned within a pocket on the first side of the housing. The pocket includes a frontward facing opening permitting the electrical connector in the image forming device to enter the pocket when the toner cartridge is installed in the image forming device. In some embodiments, the guide includes a first guide and a second guide. The first guide is spaced above the second guide with a gap between the first guide and the second guide. The inside surface includes a first inside surface on the first guide and a second inside surface on the second guide. Some embodiments include a vertical guide on the first side of the housing positioned in front of and leading rearward toward the electrical contact. The vertical guide is unobstructed permitting the vertical guide to contact the electrical connector in the image forming device during insertion of the toner cartridge into the image forming device. In some embodiments, the vertical guide includes a top guide and a bottom guide. The top guide is spaced above the bottom guide with a gap between the top guide and the bottom guide. The top guide includes a bottom surface that faces a top surface of the bottom guide. The bottom surface of the top guide and the top surface of the bottom guide are unobstructed permitting the bottom surface of the top guide and the top surface of the bottom guide to contact the electrical connector in the image forming device during insertion of the toner cartridge into the image forming device. In some embodiments, at least a portion of the bottom surface of the top guide is angled downward in the direction from the front to the rear and at least a portion of the top surface of the bottom guide is angled upward in the direction from the front to the rear permitting contact between the bottom surface of the top guide and the electrical connector in the image forming device and between the top surface of the bottom guide and the electrical connector in the image forming device to align the electrical connector in the image forming device vertically during insertion of the toner cartridge into the image forming device.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
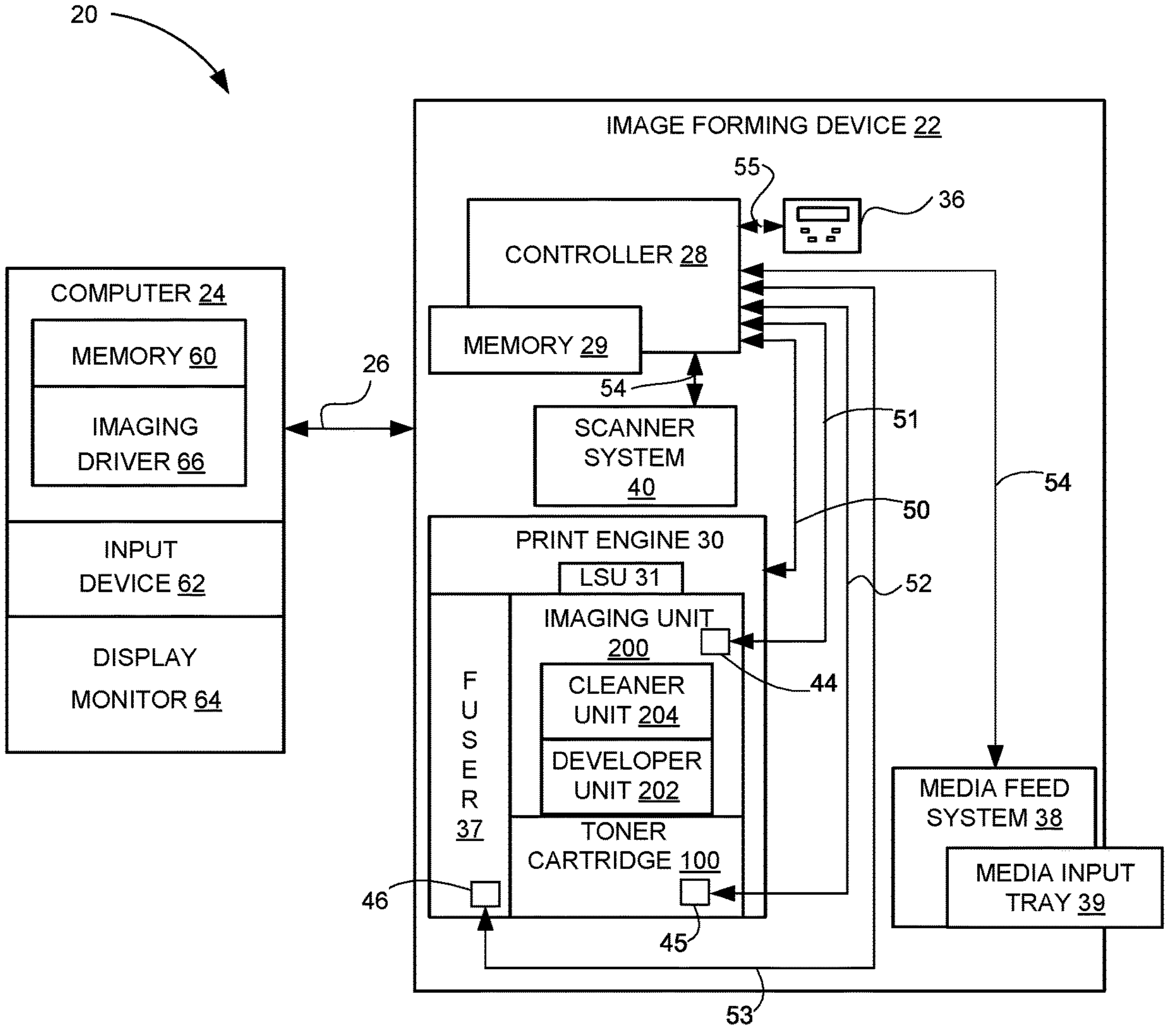
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39 and a scanner system 40. Image forming device 22 may communicate with computer 24 via a standard communication protocol, such as for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more Application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with fuser 37 and processing circuitry 46 thereon via a communications link 53. Controller 28 communicates with media feed system 38 via a communications link 54. Controller 28 communicates with scanner system 40 via a communications link 54. User interface 36 is communicatively coupled to controller 28 via a communications link 55. Controller 28 processes print and scan data and operates print engine 30 during printing and scanner system 40 during scanning. Processing circuitry 44, 45, 46 may provide authentication functions, safety and operational interlocks, operating parameters and usage information related to imaging unit 200, toner cartridge 100 and fuser 37, respectively. Each of processing circuitry 44, 45, 46 includes a processor unit and associated electronic memory. As discussed above, the processor may include one or more integrated circuits in the form of a microprocessor or central processing unit and may be formed as one or more Application-specific integrated circuits (ASICs). The memory may be any volatile or non-volatile memory or combination thereof or any memory device convenient for use with processing circuitry 44, 45, 46.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100, imaging unit 200 and fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a cleaner unit 204 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

The electrophotographic printing process is well known in the art and, therefore, is described briefly herein. During a printing operation, laser scan unit 31 creates a latent image on the photoconductive drum in cleaner unit 204. Toner is transferred from the toner sump in developer unit 202 to the latent image on the photoconductive drum by the developer roll (in the case of a single component development system) or by the magnetic roll (in the case of a dual component development system) to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
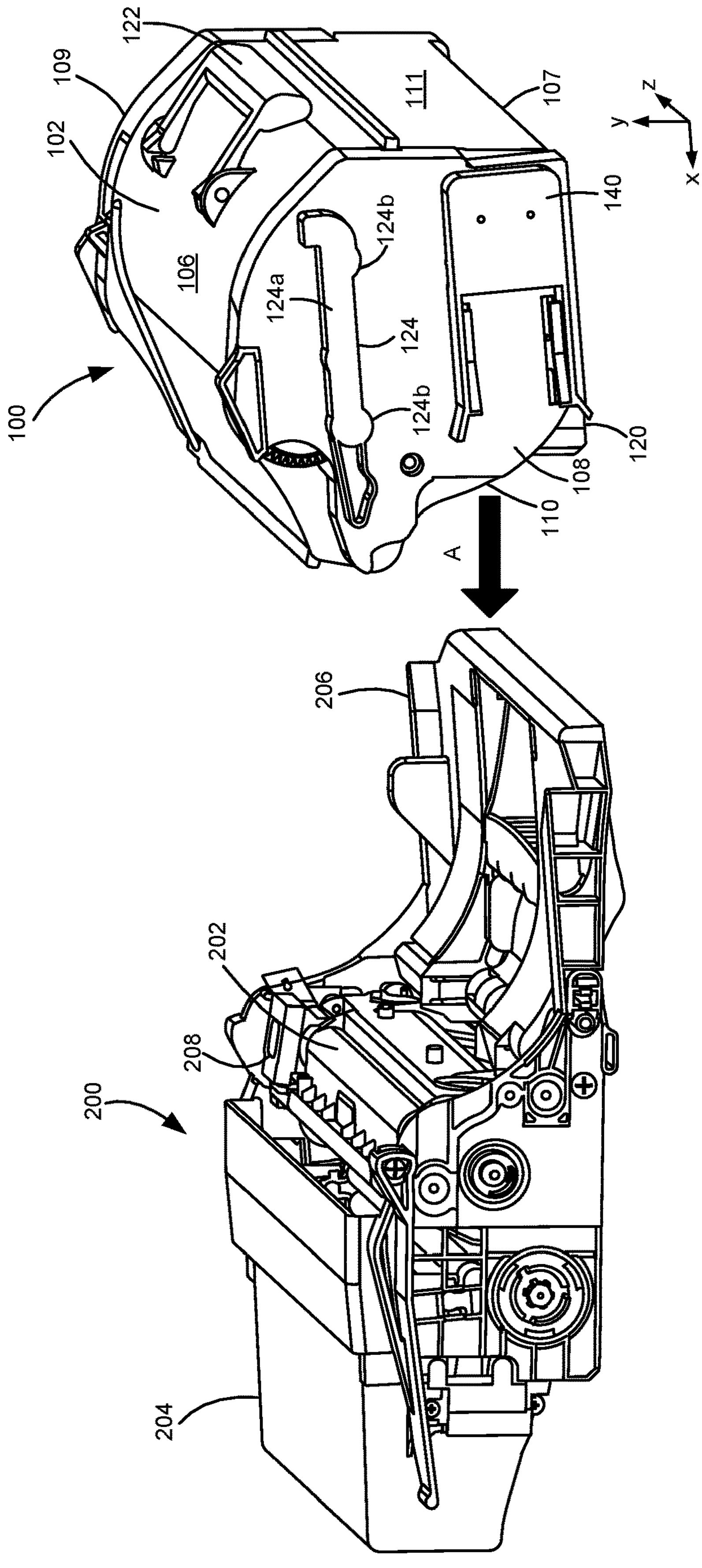
FIG. 2 is a perspective view of a toner cartridge and an imaging unit according to one example embodiment.

Referring now to FIG. 2, toner cartridge 100 and imaging unit 200 are shown according to one example embodiment. Imaging unit 200 includes a developer unit 202 and a cleaner unit 204 mounted on a common frame 206. Developer unit 202 includes a toner inlet port 208 positioned to receive toner from toner cartridge 100. As discussed above, imaging unit 200 and toner cartridge 100 are each removably installed in image forming device 22. Imaging unit 200 is first slidably inserted into image forming device 22. Toner cartridge 100 is then inserted into image forming device 22 and onto frame 206 in a mating relationship with developer unit 202 of imaging unit 200 as indicated by the arrow A shown in FIG. 2, which also indicates the direction of insertion of imaging unit 200 and toner cartridge 100 into image forming device 22. This arrangement allows toner cartridge 100 to be removed and reinserted easily when replacing an empty toner cartridge 100 without having to remove imaging unit 200. Imaging unit 200 may also be readily removed as desired in order to maintain, repair or replace the components associated with developer unit 202, cleaner unit 204 or frame 206 or to clear a media jam.

With reference to FIGS. 2-5, toner cartridge 100 includes a housing 102 having an enclosed reservoir 104 (FIG. 5) for storing toner. Housing 102 includes a top 106, a bottom 107, first and second sides 108, 109, a front 110 and a rear 111. Front 110 of housing 102 leads during insertion of toner cartridge 100 into image forming device 22 and rear 111 trails. In one embodiment, each side 108, 109 of housing 102 includes an end cap 112, 113 mounted, e.g., by fasteners or a snap-fit engagement, to side walls 114, 115 of a main body 116 of housing 102. An outlet port 118 in fluid communication with reservoir 104 is positioned on front 110 of housing 102 near side 109 for exiting toner from toner cartridge 100. Housing 102 may include legs 120 on bottom 107 to assist with the insertion of toner cartridge 100 into image forming device 22 and to support housing 102 when toner cartridge 100 is set on a flat surface. A handle 122 may be provided on top 106 or rear 111 of housing 102 to assist with insertion and removal of toner cartridge 100 into and out of image forming device 22.

Figure 3:
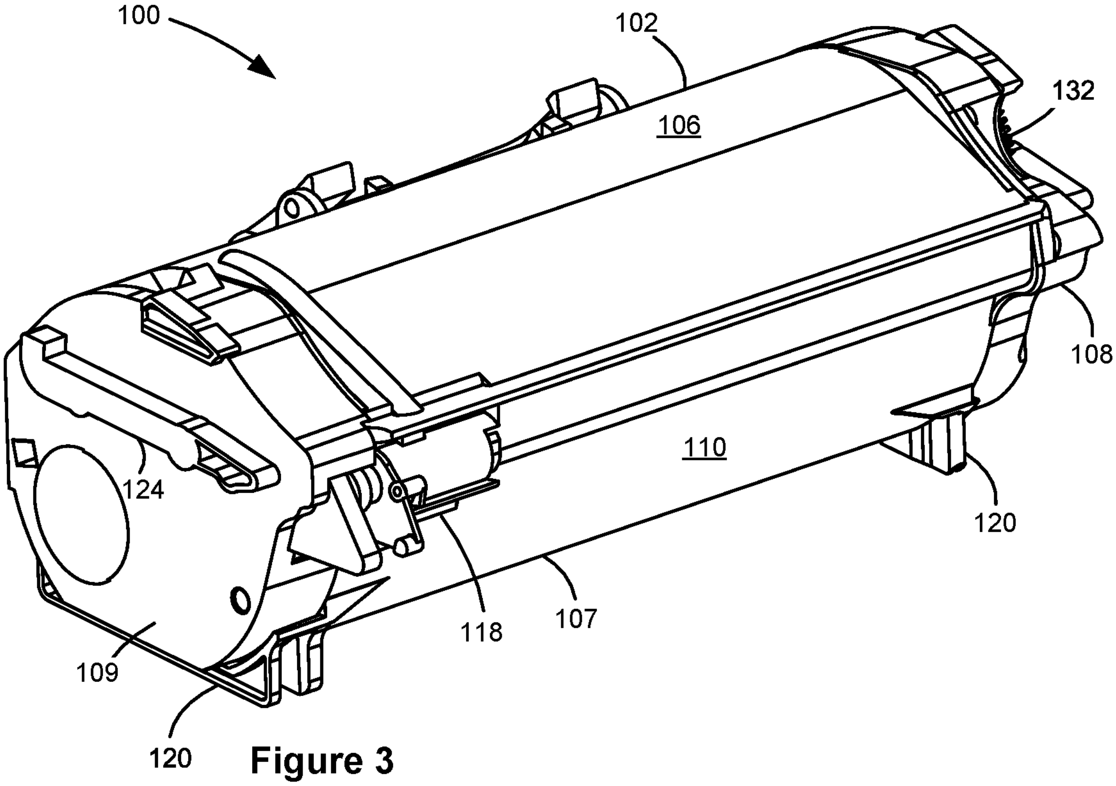
FIG. 3 is a front perspective view of the toner cartridge shown in FIG. 2.
Figure 4:
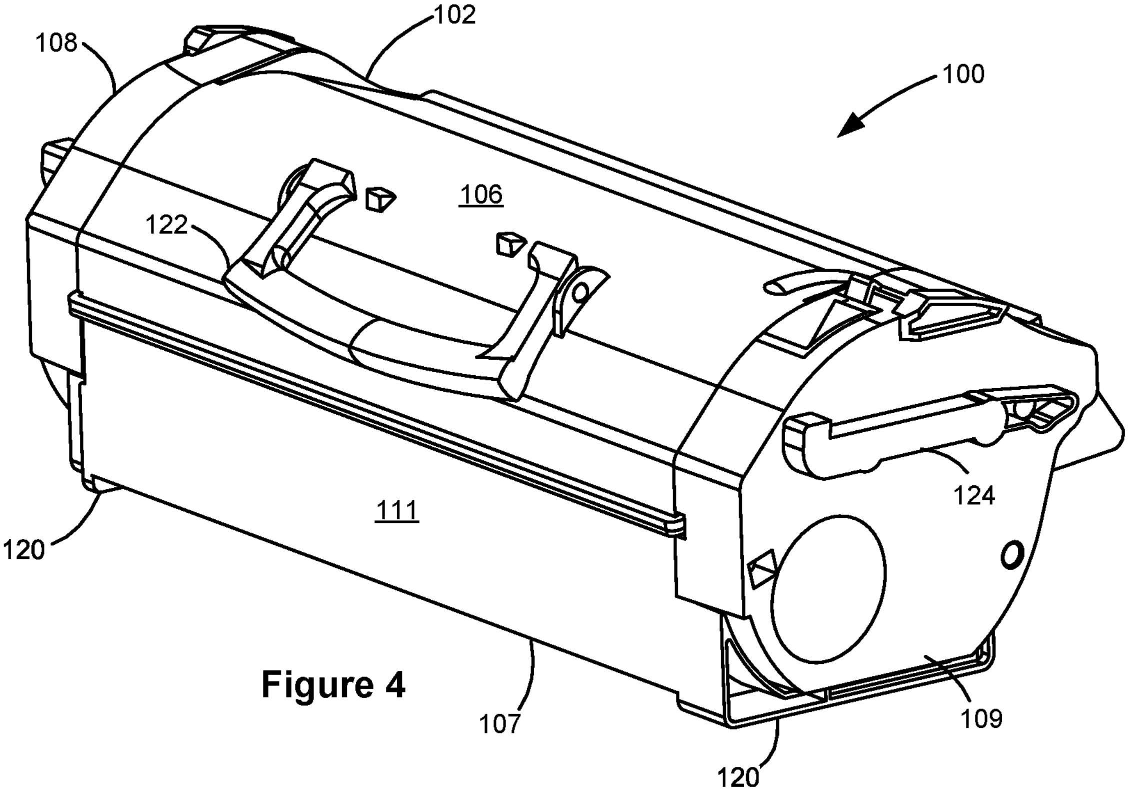
FIG. 4 is a rear perspective view of the toner cartridge shown in FIGS. 2 and 3.

Sides 108, 109 may each include an alignment guide 124 that extends outward from the respective side 108, 109 to assist the insertion of toner cartridge 100 into image forming device 22. Alignment guides 124 travel in corresponding guide slots in image forming device 22 that guide the insertion of toner cartridge 100 into image forming device 22. In the example embodiment illustrated, an alignment guide 124 is positioned on the outer side of each end cap 112, 113. Alignment guides 124 may run along a front-to-rear dimension (x-dimension in FIG. 2) of housing 102 as shown in FIGS. 2-4. In the example embodiment illustrated, each alignment guide 124 includes a wing member 124a that runs along the front-to-rear dimension on a respective side 108, 109 of housing 102. In the example embodiment illustrated, each alignment guide 124 also includes one or more rounded projections 124b formed on the bottom of wing member 124a. Rounded projections 124b define contact surfaces on the bottom of alignment guide 124 that ride on top of a corresponding guide surface as toner cartridge 100 is inserted into image forming device 22. However, alignment guide 124 may take many other suitable shapes and forms. For example, in another embodiment, alignment guide 124 includes one or more ribs on each side 108, 109 of housing 102 that extend along the front-to-rear dimension of housing 102. In another embodiment, alignment guide 124 includes one or more rounded pegs or projections from each side 108, 109, similar to rounded projections 124b, that may be spaced from each other along the front-to-rear dimension of housing 102.

Figure 5:
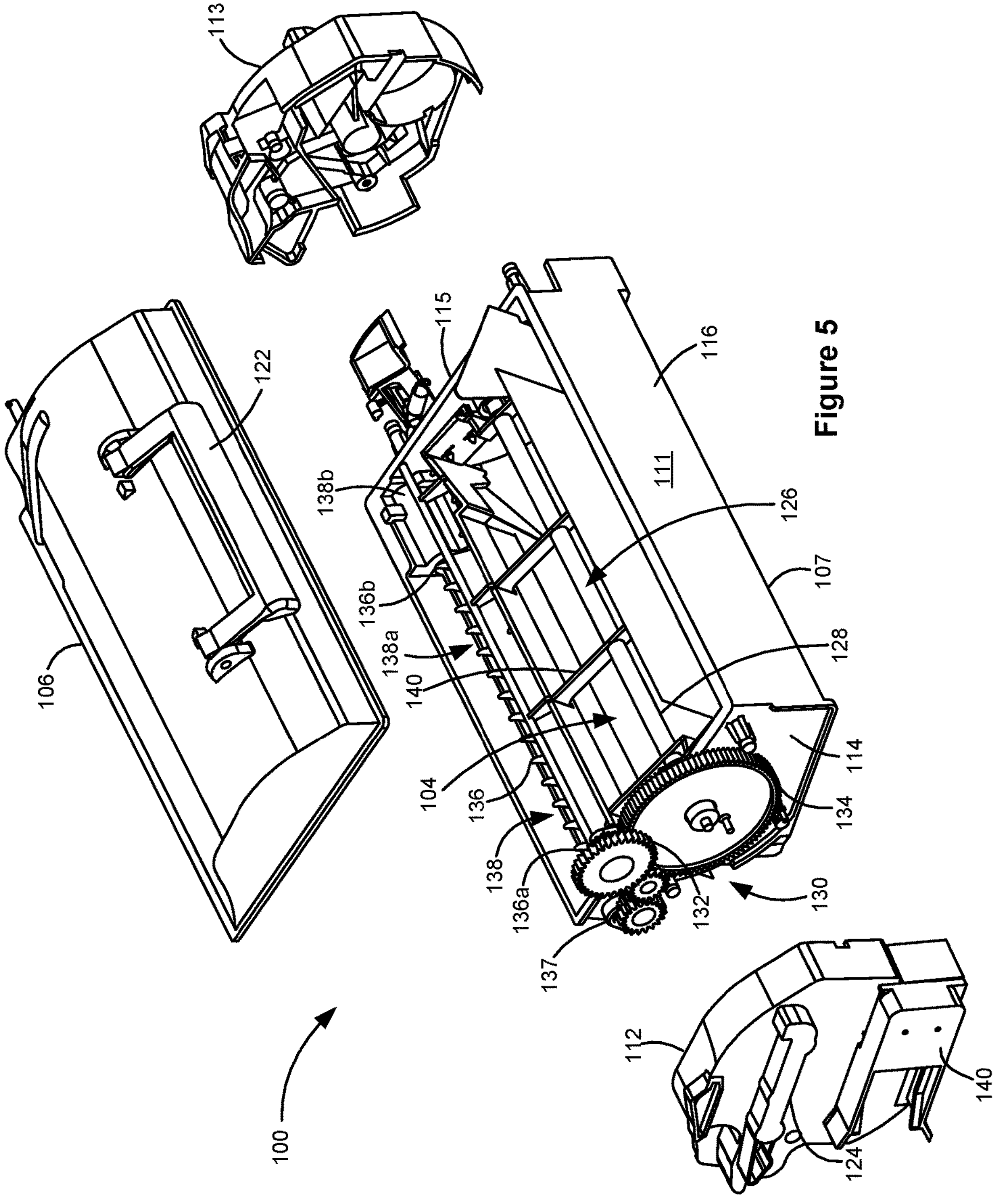
FIG. 5 is an exploded view of the toner cartridge shown in FIGS. 2-4 showing a reservoir for holding toner therein.

With reference to FIG. 5, a toner delivery assembly 126 is rotatably mounted within toner reservoir 104 with first and second ends of a drive shaft 128 of toner delivery assembly 126 extending through aligned openings in side walls 114, 115, respectively. Bushings may be provided on each end of drive shaft 128 where drive shaft 128 passes through side walls 114, 115. A drive train 130 is operatively connected to drive shaft 128 and may be positioned within a space formed between end cap 112 and side wall 114. Drive train 130 includes a main input gear 132 that engages with a drive system in image forming device 22 that provides torque to main input gear 132. As shown in FIG. 3, in one embodiment, a front portion of main input gear 132 is exposed at the front 110 of housing 102 near the top 106 of housing 102 where main input gear 132 engages the drive system in image forming device 22. With reference back to FIG. 5, drive train 130 also includes a drive gear 134 on one end of drive shaft 128 that is connected to main input gear 132 either directly or via one or more intermediate gears to rotate drive shaft 128.

An auger 136 having first and second ends 136a, 136b and a spiral screw flight is positioned in a channel 138 that runs along the front 110 of housing 102 from side 108 to side 109. Channel 138 may be integrally molded as part of the front 110 of main body 116 or formed as a separate component that is attached to the front 110 of main body 116. Channel 138 is generally horizontal in orientation along with toner cartridge 100 when toner cartridge 100 is installed in image forming device 22. Outlet port 118 is positioned at the bottom of channel 138 so that gravity assists in exiting toner through outlet port 118. First end 136a of auger 136 extends through side wall 114 and a drive gear 137 of drive train 130 is provided on first end 136a that is connected to main input gear 132 either directly or via one or more intermediate gears. Channel 138 includes an open portion 138a and may include an enclosed portion 138b. Open portion 138a is open to toner reservoir 104 and extends from side 108 toward second end 136b of auger 136. Enclosed portion 138b of channel 138 extends from side 109 and encloses second end 136b of auger 136. In this embodiment, outlet port 118 is positioned at the bottom of enclosed portion 138b of channel 138.

Figure 6:
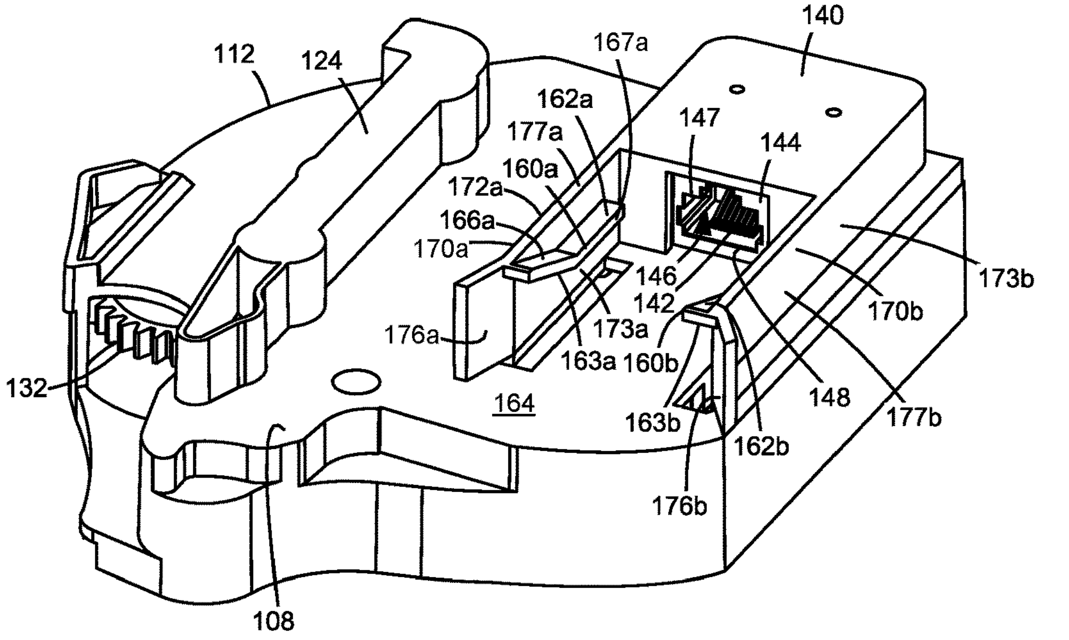
FIG. 6 is a perspective view of an end cap of the toner cartridge showing an electrical connector according to one example embodiment.
Figure 7:
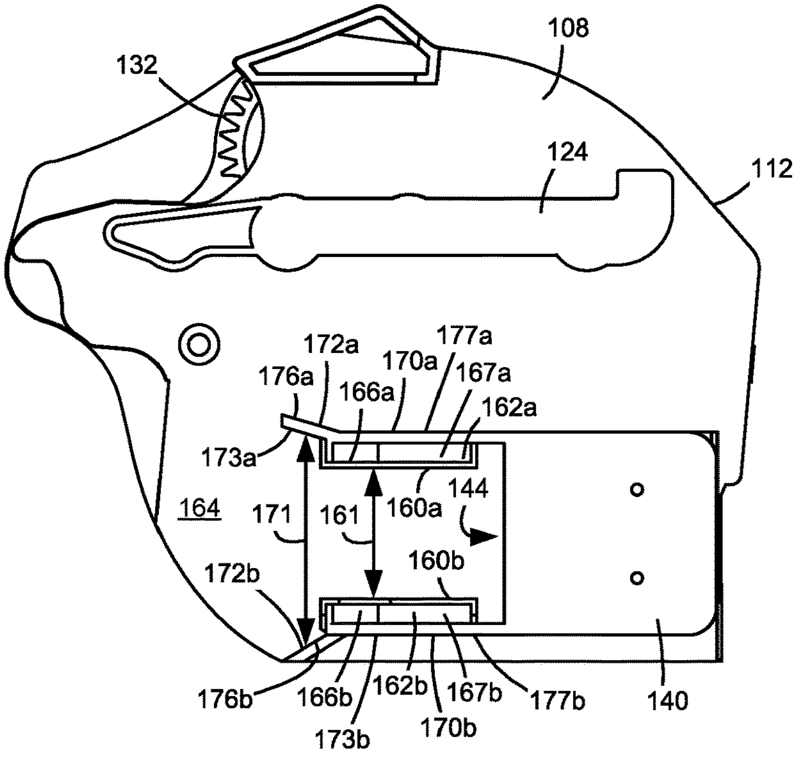
FIG. 7 is a side elevation view of the toner cartridge shown in FIG. 6.

With reference to FIGS. 6 and 7, toner cartridge 100 includes an electrical connector 140. In the example embodiment illustrated, electrical connector 140 is positioned on side 108 of housing 102, below main input gear 132 and below alignment guide 124 on side 108. However, electrical connector 140 may be positioned in any suitable location on toner cartridge 100, such as, for example, on side 108 above alignment guide 124, on side 109, etc. Electrical connector 140 includes one or more electrical contacts 142 that are positioned to contact corresponding electrical contacts of an electrical connector 300 (FIGS. 10-12) in image forming device 22 when toner cartridge 100 is installed in image forming device 22 as discussed in greater detail below.

In some embodiments, electrical connector 140 includes a standard connector interface, such as, for example, a Registered Jack (RJ) connector. Electrical connector 140 may include a male plug end of the connector interface or a female socket, port or jack end of the connector interface with electrical connector 300 in the image forming device 22 forming the opposite female or male end of the connector interface. For example, in the example embodiment illustrated in FIG. 6, electrical connector 140 includes a female socket 144 of an RJ45 connector. In this embodiment, electrical contacts 142 are positioned within a pocket 146 of electrical connector 140 that is sized to receive the corresponding male plug end of electrical connector 300 in image forming device 22. Pocket 146 includes a forward facing opening 148 at a front end 147 of pocket 146 that faces toward the direction of insertion of toner cartridge 100 into image forming device 22, indicated by the arrow A shown in FIG. 2. Opening 148 permits the male plug end of electrical connector 300 in image forming device 22 to enter pocket 146 as toner cartridge 100 is inserted into image forming device 22 as discussed in greater detail below.

Figure 8:
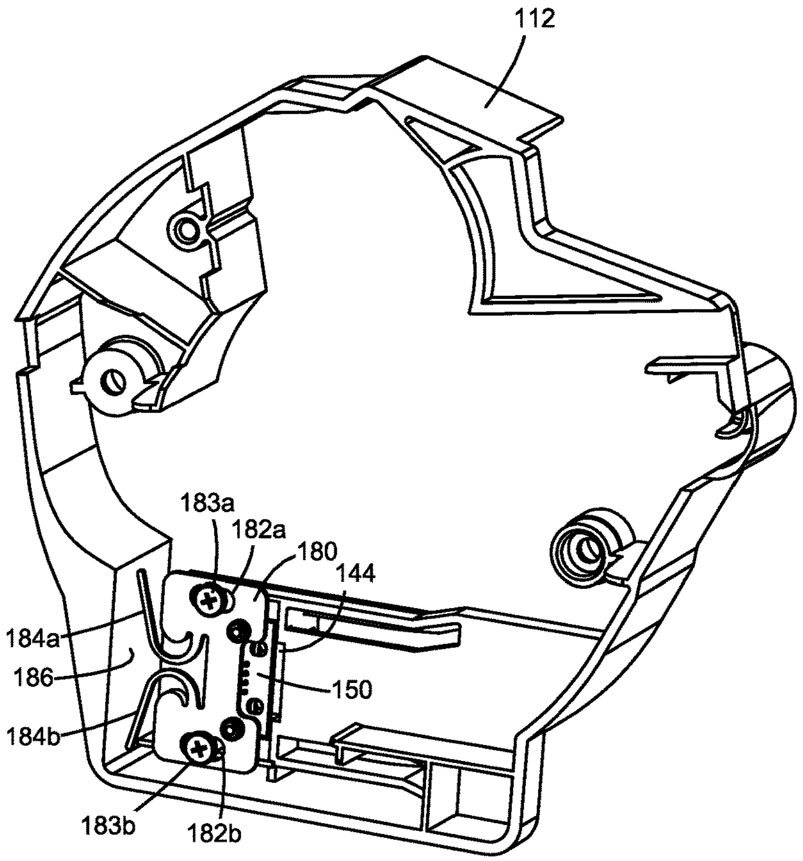
FIG. 8 is a side elevation view of an inner side of the end cap of the toner cartridge shown in FIGS. 6 and 7 showing a printed circuit board mounted thereon according to one example embodiment.

A printed circuit board 150 is mounted on housing 102 and electrically connected to electrical contacts 142. Printed circuit board 150 includes processing circuitry 45, which may include a processor and associated memory as discussed above. For example, FIG. 8 shows printed circuit board 150 mounted on an inner side of end cap 112. In this embodiment, printed circuit board 150 is attached to socket 144 with the components of printed circuit board 150 electrically connected to electrical contacts 142, e.g., by suitable electrical traces and/or wires. It will be appreciated that printed circuit board 150 may be positioned in other suitable locations on toner cartridge 100, such as, for example, on rear 111 of housing 102.

Figure 9:
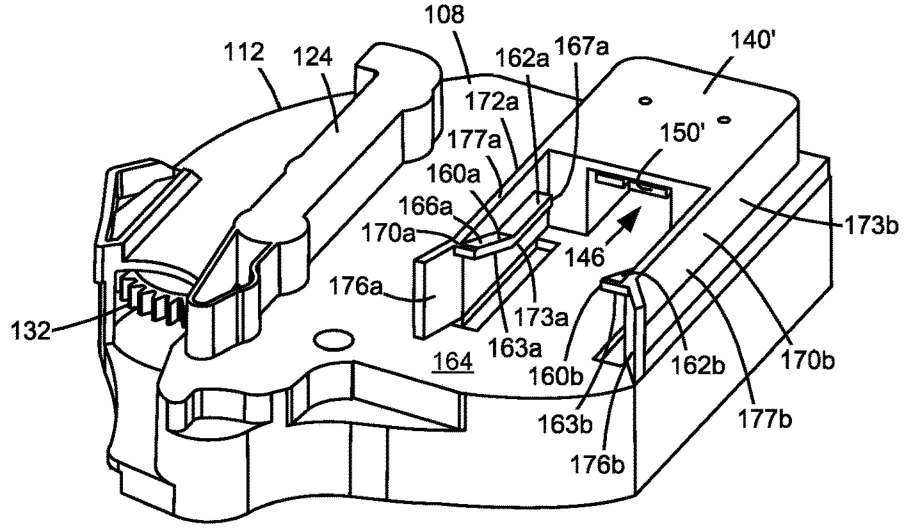
FIG. 9 is a perspective view of an end cap of the toner cartridge showing an electrical connector according to a second example embodiment.

In other embodiments, electrical connector 140 includes a custom or non-standard connector interface. For example, FIG. 9 shows an example embodiment where toner cartridge 100 includes an electrical connector 140' that includes a printed circuit board 150' positioned within pocket 146 with electrical contacts (not shown) on printed circuit board 150' exposed within pocket 146 permitting the electrical contacts on printed circuit board 150' to contact corresponding electrical contacts of the electrical connector in image forming device 22 when toner cartridge 100 is installed in image forming device 22. In the example embodiment illustrated, printed circuit board 150' is positioned on an inner surface of pocket 146 with the electrical contacts exposed and facing inward sideways, i.e., axially inward with respect to drive shaft 128 and auger 136 toward side 109 in the example embodiment illustrated. However, printed circuit board 150' may be positioned in any suitable location permitting the electrical contacts on printed circuit board 150' to contact the corresponding electrical contacts of the electrical connector in image forming device 22 when toner cartridge 100 is installed in image forming device 22.

With reference back to FIGS. 6 and 7, toner cartridge 100 includes at least one side guide positioned in front of (closer to front 110 of housing 102) and leading rearward toward electrical contacts 142 of electrical connector 140. The side guide is positioned ahead of electrical contacts 142 with respect to the direction of insertion of toner cartridge 100 into image forming device 22. The side guide positions electrical connector 300 in image forming device 22 in a side-to-side dimension (z-dimension in FIG. 2) of housing 102 as toner cartridge 100 is inserted into image forming device 22 as discussed in greater detail below. In the example embodiment illustrated, the side guide includes a pair of guides 160*a*, 160*b* positioned in front of and leading rearward toward opening 148 to pocket 146. Guides 160*a*, 160*b* are spaced vertically from each other such that guide 160*a* is spaced above (closer to top 106) guide 160*b* with a gap 161 formed between guide 160*a* and 160*b*. Each guide 160*a*, 160*b* includes an outside surface 162*a*, 162*b* that faces outward sideways, i.e., axially outward from side 108 with respect to drive shaft 128 and auger 136 in the example embodiment illustrated. Each guide 160*a*, 160*b* also includes an inside surface 163*a*, 163*b* that faces inward sideways, i.e., axially inward with respect to drive shaft 128 and auger 136 toward side 109 in the example embodiment illustrated.

Inside surfaces 163*a*, 163*b* are spaced outward sideways from and face an outer side surface 164 of side 108 of housing 102. For example, in the embodiment illustrated, inside surfaces 163*a*, 163*b* are spaced outward sideways from and face an outer side surface 164 of end cap 112. Inside surfaces 163*a*, 163*b* of guides 160*a*, 160*b* are unobstructed to permit electrical connector 300 in image forming device 22 to contact inside surfaces 163*a*, 163*b* as toner cartridge 100 is inserted into image forming device 22. At least a portion of each inside surface 163*a*, 163*b* is angled or tapered inward sideways from front 110 to rear 111 (along the front-to-rear dimension of housing 102 in a direction from front 110 to rear 111) such that contact between electrical connector 300 in image forming device 22 and inside surfaces 163*a*, 163*b* draws electrical connector 300 inward sideways relative to housing 102, i.e., axially inward with respect to drive shaft 128 and auger 136 in the example embodiment illustrated, as toner cartridge 100 advances during insertion into image forming device 22. For example, in the example embodiment illustrated, a front portion 166*a*, 166*b* of each guide 160*a*, 160*b* includes an angled inside surface 163*a*, 163*b* that is angled inward sideways from front 110 to rear 111. In the embodiment shown, inside surfaces 163*a*, 163*b* of front portions 166*a*, 166*b* of guides 160*a*, 160*b* are substantially planar; however, inside surfaces 163*a*, 163*b* of front portions 166*a*, 166*b* of guides 160*a*, 160*b* may instead be curved, rounded, multi-faceted, etc. as they angle or taper inward sideways. In some embodiments, a rear portion 167*a*, 167*b* of each guide 160*a*, 160*b* includes a substantially flat inside surface 163*a*, 163*b* that is not angled sideways from front 110 to rear 111, i.e., rear portions 167*a*, 167*b* of inside surfaces 163*a*, 163*b* have a substantially constant position in the side-to-side dimension of housing 102.

Toner cartridge 100 may include a vertical guide positioned in front of (closer to front 110 of housing 102) and leading rearward toward electrical contacts 142 of electrical connector 140. The vertical guide is positioned ahead of electrical contacts 142 with respect to the direction of insertion of toner cartridge 100 into image forming device 22. The vertical guide positions electrical connector 300 in image forming device 22 in a vertical dimension (y-dimension in FIG. 2) of housing 102 as toner cartridge 100 is inserted into image forming device 22 as discussed in greater detail below. In the example embodiment illustrated, the vertical guide includes a pair of guides 170*a*, 170*b* positioned in front of and leading rearward toward opening 148 to pocket 146. Guide 170*a* is positioned above (closer to top 106) electrical contacts 142 and guide 170*b* is positioned below (closer to bottom 107) electrical contacts 142. Guides 170*a*, 170*b* extend outward sideways from outer side surface 164. Guides 170*a*, 170*b* are spaced vertically from each other such that guide 170*a* is spaced above (closer to top 106) guide 170*b* with a gap 171 formed between guide 170*a* and 170*b*. In the example embodiment illustrated, at least a portion of each guide 170*a*, 170*b* is positioned in front of side guides 160*a*, 160*b*. Each guide 170*a*, 170*b* includes a top surface 172*a*, 172*b* that faces upward toward top 106 and a bottom surface 173*a*, 173*b* that faces downward toward bottom 107.

Bottom surface 173*a* of guide 170*a* and top surface 172*b* of guide 170*b* are unobstructed to permit electrical connector 300 in image forming device 22 to contact bottom surface 173*a* and top surface 172*b* as toner cartridge 100 is inserted into image forming device 22. At least a portion of bottom surface 173*a* and top surface 172*b* may be angled or tapered vertically toward each other from front 110 to rear 111 such that contact between electrical connector 300 in image forming device 22 and bottom surface 173*a* and/or top surface 172*b* centers electrical connector 300 vertically with opening 148 as toner cartridge 100 advances during insertion into image forming device 22. Specifically, at least a portion of bottom surface 173*a* may be angled or tapered downward from front 110 to rear 111 and/or at least a portion of top surface 172*b* may be angled or tapered upward from front 110 to rear 111. In the example embodiment illustrated, a front portion 176*a* of guide 170*a* includes an angled bottom surface 173*a* that is angled downward from front 110 to rear 111 and a front portion 176*b* of guide 170*b* includes an angled top surface 172*b* that is angled upward from front 110 to rear 111. In the embodiment shown, bottom surface 173*a* and top surface 172*b* of front portions 176*a*, 176*b* of guides 170*a*, 170*b* are substantially planar; however, bottom surface 173*a* and top surface 172*b* may instead be curved, rounded, multi-faceted, etc. as they angle or taper downward and upward, respectively. In some embodiments, a rear portion 177*a* of guide 170*a* includes a substantially flat bottom surface 173*a* and a rear portion 177*b* of guide 170*b* includes a substantially flat top surface 172*b* that are not angled vertically from front 110 to rear 111, i.e., rear portions 177*a*, 177*b* of bottom surface 173*a* and top surface 172*b* have a substantially constant position in the vertical dimension of housing 102.

It will be appreciated that side guides 160*a*, 160*b* and vertical guides 170*a*, 170*b* are not limited to the example configurations illustrated and may take other suitable shapes and forms. For example, in another embodiment, a portion of a bottom surface of side guide 160*a* is angled downward from front 110 to rear 111 and serves as vertical guide 170*a* and a portion of a top surface of side guide 160*b* is angled upward from front 110 to rear 111 and serves as vertical guide 170*b*.

Figure 10:
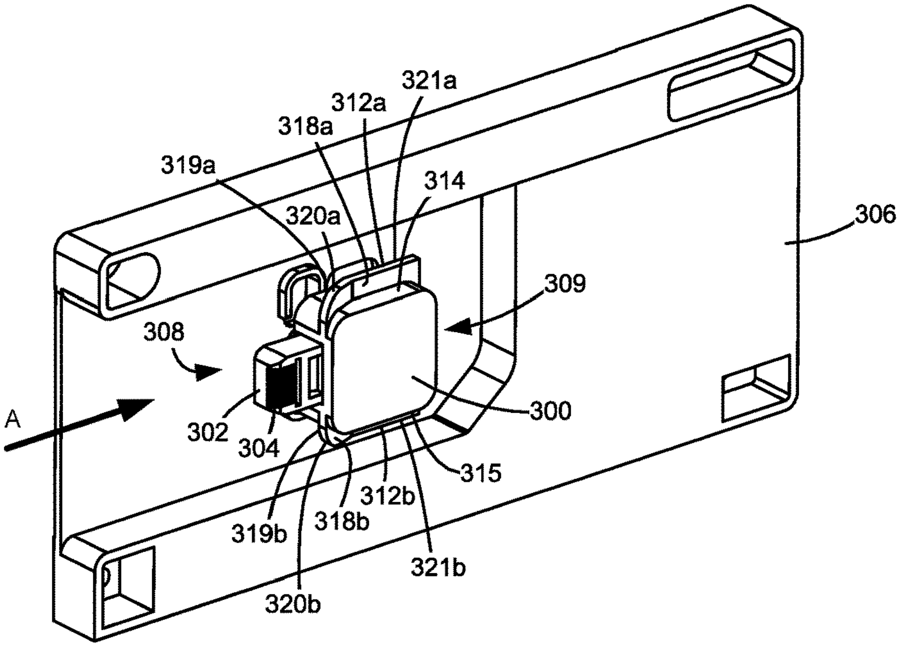
FIG. 10 is a perspective view of an electrical connector in an image forming device showing the electrical connector in its biased position according to one example embodiment.
Figure 11:
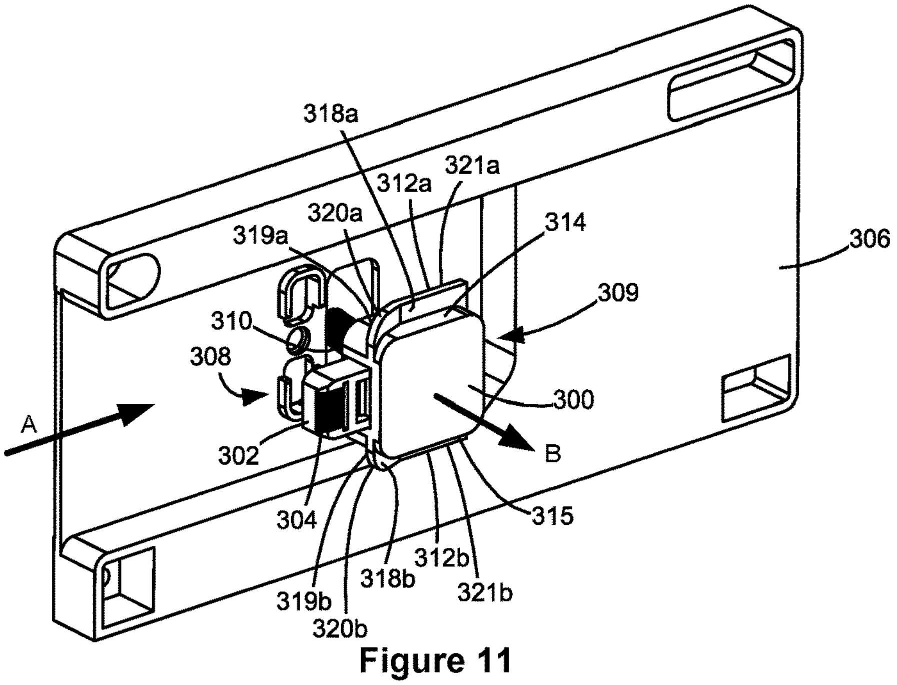
FIG. 11 is a perspective view of the electrical connector shown in FIG. 10 showing the electrical connector pulled away from a frame of the image forming device counter to the bias on the electrical connector according to one example embodiment.
Figure 12:
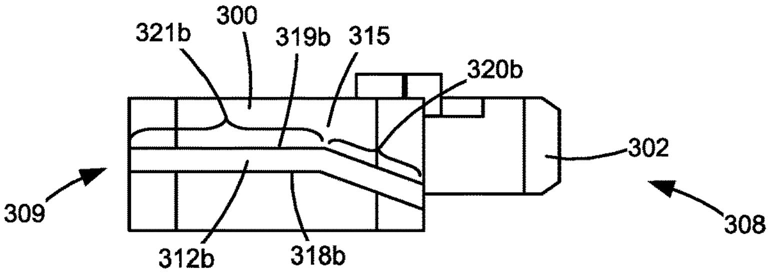
FIG. 12 is a bottom plan view of the electrical connector shown in FIGS. 10 and 11.

FIGS. 10-12 show an electrical connector 300 in image forming device 22 according to one example embodiment that is configured to operate with electrical connector 140 shown in FIGS. 6 and 7. In the example embodiment illustrated, electrical connector 300 includes a male plug 302 of an RJ45 connector. However, as discussed above, electrical connector 300 may include a male or female connector depending on the configuration of electrical connector 140 and may include a standard or custom connector interface. Electrical connector 300 includes one or more electrical contacts 304 positioned on male plug 302 that contact corresponding electrical contacts 142 of electrical connector 140 when toner cartridge 100 is installed in image forming device 22. Electrical contacts 304 are electrically connected to controller 28 in order to permit communication between processing circuitry 45 and controller 28 when electrical contacts 142 mate with electrical contacts 304.

Electrical connector 300 is mounted to a frame 306 of image forming device 22 at a position to engage electrical connector 140 when toner cartridge 100 is installed in image forming device 22. Frame 306 extends along the direction of insertion of toner cartridge 100 into image forming device 22. In the example embodiment illustrated, electrical connector 300 is positioned adjacent to side 108 when toner cartridge 100 is installed in image forming device 22. Electrical connector 300 includes a leading end 308 and a trailing end 309. The arrow A in FIGS. 10 and 11 indicates the direction of insertion of toner cartridge 100 and imaging unit 200 into image forming device 22. Leading end 308 is positioned closer to the direction from which toner cartridge 100 enters image forming device 22 and trailing end 309 is positioned farther from the direction from which toner cartridge 100 enters image forming device 22 such that toner cartridge 100 reaches leading end 308 before reaching trailing end 309 as toner cartridge 100 is inserted into image forming device 22. Male plug 302 and electrical contacts 304 are positioned on leading end 308 of electrical connector 300.

Electrical connector 300 is movable toward and away from frame 306, sideways with respect to toner cartridge 100. Electrical connector 300 is biased inward toward frame 306 and outward sideways with respect to toner cartridge 100, away from side 108 of housing 102. In the example embodiment illustrated, an extension spring 310 biases electrical connector 300 toward frame 306. However, any suitable biasing member may be used. FIG. 10 shows electrical connector 300 in its home, biased position as a result of the bias applied by extension spring 310. FIG. 11 shows electrical connector 300 pulled away, as indicated by the arrow B, from frame 306, counter to the bias on electrical connector 300, in a direction orthogonal to the direction of insertion of toner cartridge 100 into image forming device 22 with electrical connector 300 in its operative position. The bias on electrical connector 300 pulls the electrical connector 300 tight to frame 306 when electrical connector 300 is not engaged with electrical connector 140 of toner cartridge 100 to a recessed position against frame 306 as shown in FIG. 10 in order to protect electrical connector 300 from accidental contact with imaging unit 200, which may result in damage to electrical connector 300, during insertion or removal of imaging unit 200 into or from image forming device 22. The bias on electrical connector 300 also protects electrical connector 300 from damage when the area inside image forming device 22 that houses imaging unit 200 and toner cartridge 100 is serviced or repaired including, for example, when jammed media is removed from this area.

Electrical connector 300 also includes one or more guide wings 312*a*, 312*b* that engage side guides 160*a*, 160*b* as toner cartridge 100 is inserted into image forming device 22 to align male plug 302 of electrical connector 300 in the side-to-side dimension of housing 102 with socket 144 of toner cartridge 100. Guide wing 312*a* extends upward from a top portion 314 of electrical connector 300 and guide wing 312*b* extends downward from a bottom portion 315 of electrical connector 300. Guide wings 312*a*, 312*b* are positioned downstream from male plug 302 with respect to the direction of insertion A of toner cartridge 100 into image forming device 22 as shown in FIGS. 10 and 11. Each guide wing 312*a*, 312*b* includes an inside surface 318*a*, 318*b* that faces away from frame 306 and inward sideways with respect to toner cartridge 100, toward side 108. Each guide wing 312*a*, 312*b* also includes an outside surface 319*a*, 319*b* that faces toward frame 306 and outward sideways with respect to toner cartridge 100, away from side 108.

Outside surfaces 319*a*, 319*b* of guides 160*a*, 160*b* are positioned to contact inside surfaces 163*a*, 163*b* of electrical connector 140 as toner cartridge 100 is inserted into image forming device 22. In the example embodiment illustrated, each outside surface 319*a*, 319*b* is angled or tapered toward frame 306, outward sideways with respect to toner cartridge 100, along the direction of insertion of toner cartridge 100 into image forming device 22 in a manner that corresponds with the angle or taper of inside surfaces 163*a*, 163*b* of electrical connector 140. For example, in the example embodiment illustrated, a leading portion 320*a*, 320*b* of each guide wing 312*a*, 312*b* includes an angled outside surface 319*a*, 319*b* that is angled toward frame 306, outward sideways with respect to toner cartridge 100, along the direction of insertion of toner cartridge 100 into image forming device 22. In the embodiment shown, outside surfaces 319*a*, 319*b* of leading portions 320*a*, 320*b* of guide wings 312*a*, 312*b* are substantially planar; however, outside surfaces 319*a*, 319*b* of leading portions 320*a*, 320*b* of guide wings 312*a*, 312*b* may instead be curved, rounded, multi-faceted, etc. as they angle or taper. In some embodiments, a trailing portion 321*a*, 321*b* of each guide wing 312*a*, 312*b* includes a substantially flat outside surface 319*a*, 319*b* that is not angled or is only minimally angled relative to frame 306 when electrical connector 300 is in its operative position engaged with electrical connector 140. It will be appreciated that guide wings 312*a*, 312*b* are not limited to the example configuration illustrated and may take other suitable shapes and forms.

FIGS. 13A-16B are sequential views illustrating the positioning of electrical connector 140 and electrical connector 300 as toner cartridge 100 is inserted into image forming device 22. FIGS. 13A, 14A, 15A and 16A are perspective views of end cap 112 of toner cartridge 100 showing the position of electrical connector 300 in image forming device 22 relative to electrical connector 140 as toner cartridge 100 is inserted into image forming device 22 along the direction of insertion indicated by arrow A. The remainder of toner cartridge 100 and frame 306 of image forming device 22 are omitted from FIGS. 13A, 14A, 15A and 16A for clarity. FIGS. 13B, 14B, 15B and 16B are schematic views illustrating the position of electrical connector 300 relative to electrical connector 140 when toner cartridge 100 is at each of the positions of toner cartridge 100 shown in FIGS. 13A, 14A, 15A and 16A. FIGS. 13B, 14B, 15B and 16B show the position of frame 306 schematically as a dashed line to aid in illustrating the position of electrical connector 300 relative to frame 306 during insertion of toner cartridge 100.

Figure 13A:
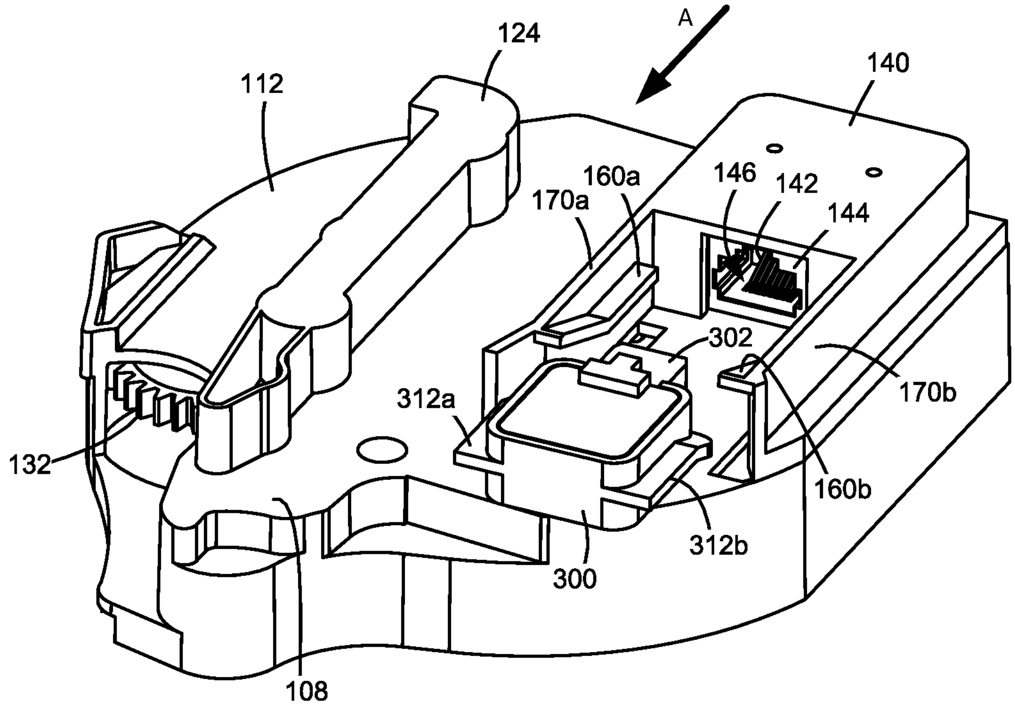
FIG. 13A is a perspective view of the end cap of the toner cartridge showing the position of the electrical connector of the toner cartridge shown in FIGS. 6-8 relative to the electrical connector in the image forming device shown in FIGS. 10-12 during insertion of the toner cartridge into the image forming device according to one example embodiment.
Figure 13B:
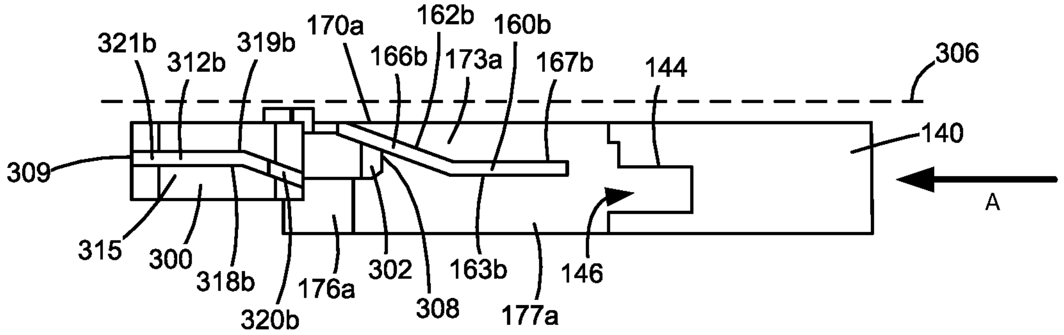
FIG. 13B is a schematic view illustrating the position of the electrical connector in the image forming device relative to the electrical connector of the toner cartridge at the position of the toner cartridge shown in FIG. 13A.

FIGS. 13A and 13B show the position of electrical connector 300 relative to electrical connector 140 as electrical connector 140 approaches electrical connector 300 during insertion of toner cartridge 100 into image forming device 22, before side guides 160*a*, 160*b* reach guide wings 312*a*, 312*b*. When toner cartridge 100 is at the position shown in FIGS. 13A and 13B, electrical connector 300 is in its biased position shown in FIG. 10. If male plug 302 of electrical connector 300 is misaligned in the vertical dimension of housing 102 with socket 144 of electrical connector 140 as guide wings 312*a*, 312*b* first reach vertical guides 170*a*, 170*b*, the angled bottom surface 173*a* of guide 170*a* will contact guide wing 312*a* or the angled top surface 172*b* of guide 170*b* will contact guide wing 312*b*. The contact between guide wing 312*a* or 312*b* and bottom surface 173*a* of guide 170*a* or top surface 172*b* of guide 170*b* causes electrical connector 300 to move vertically down or up, respectively, as toner cartridge 100 continues to advance into image forming device 22 as a result of the angles of bottom surface 173*a* of guide 170*a* and top surface 172*b* of guide 170*b* until male plug 302 of electrical connector 300 is aligned in the vertical dimension of housing 102 with socket 144 of electrical connector 140.

Figure 14A:
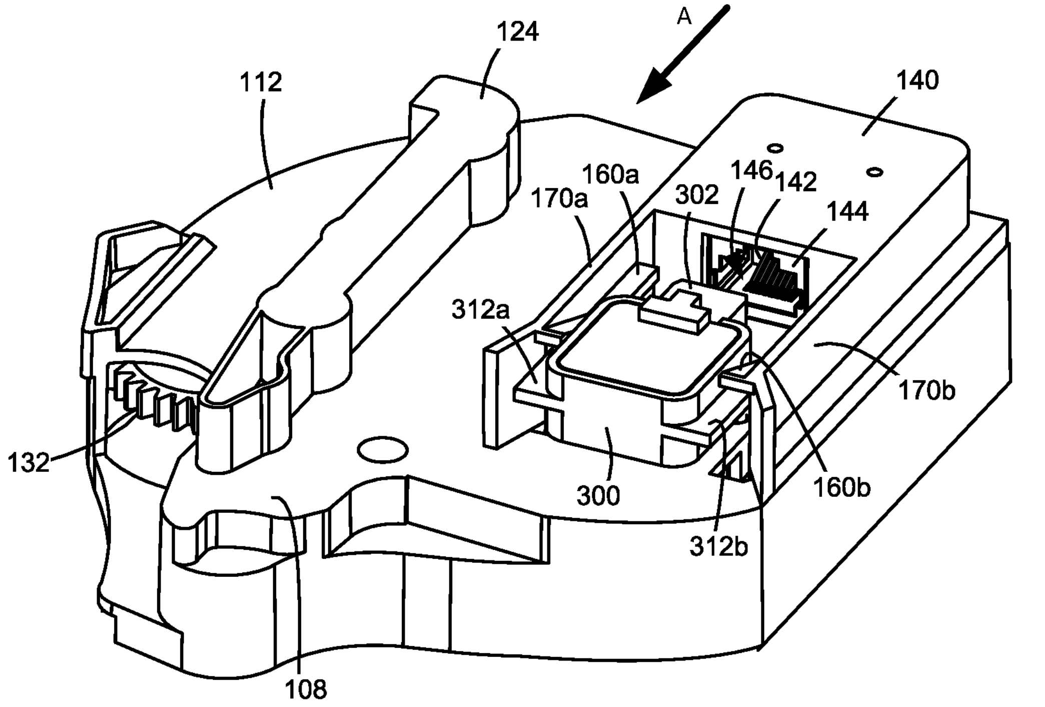
FIG. 14A is a perspective view of the end cap of the toner cartridge showing the position of the electrical connector of the toner cartridge shown in FIGS. 6-8 relative to the electrical connector in the image forming device shown in FIGS. 10-12 as the toner cartridge advances further into the image forming device according to one example embodiment.
Figure 14B:
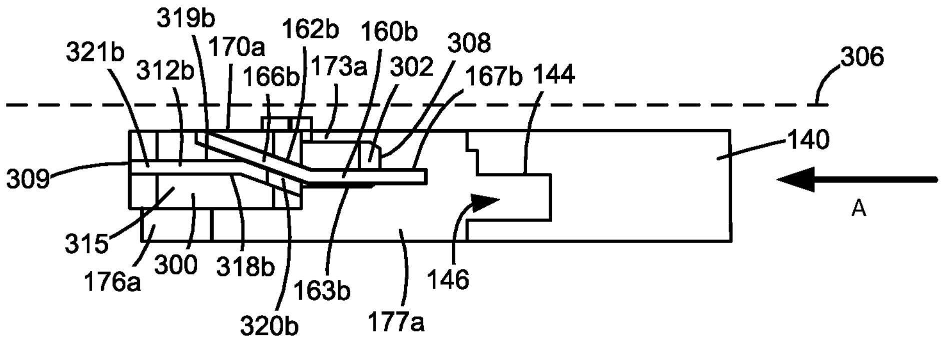
FIG. 14B is a schematic view illustrating the position of the electrical connector in the image forming device relative to the electrical connector of the toner cartridge at the position of the toner cartridge shown in FIG. 14A.

FIGS. 14A and 14B show the position of electrical connector 300 relative to electrical connector 140 as toner cartridge 100 advances further into image forming device 22. As toner cartridge 100 advances to the position shown in FIGS. 14A and 14B, inside surfaces 163*a*, 163*b* of front portions 166*a*, 166*b* of guides 160*a*, 160*b* contact outside surfaces 319*a*, 319*b* of leading portions 320*a*, 320*b* of guide wings 312*a*, 312*b*. As toner cartridge 100 continues to advance, inside surfaces 163*a*, 163*b* of front portions 166*a*, 166*b* of guides 160*a*, 160*b* slide along outside surfaces 319*a*, 319*b* of leading portions 320*a*, 320*b* of guide wings 312*a*, 312*b*. The angle of inside surfaces 163*a*, 163*b* of front portions 166*a*, 166*b* of guides 160*a*, 160*b* creates an inward sideways force relative to housing 102 on electrical connector 300 that overcomes the bias applied to electrical connector 300 causing electrical connector 300 to move away from frame 306 and toward side 108 of toner cartridge 100 until male plug 302 of electrical connector 300 is aligned in the side-to-side dimension of housing 102 with socket 144 of electrical connector 140. Bottom surface 173*a* of rear portion 177*a* of guide 170*a* and top surface 172*b* of rear portion 177*b* of guide 170*b* maintain the vertical alignment of male plug 302 of electrical connector 300 with socket 144 of electrical connector 140.

Figure 15A:
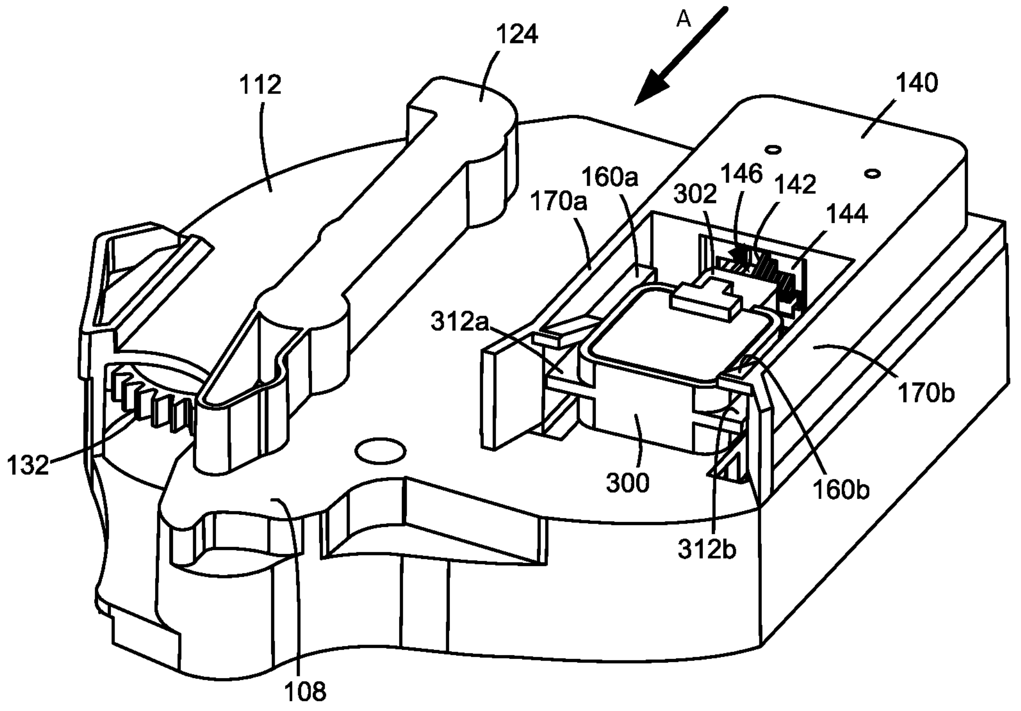
FIG. 15A is a perspective view of the end cap of the toner cartridge showing the position of the electrical connector of the toner cartridge shown in FIGS. 6-8 relative to the electrical connector in the image forming device shown in FIGS. 10-12 as the toner cartridge nears its operative position in the image forming device according to one example embodiment.
Figure 15B:
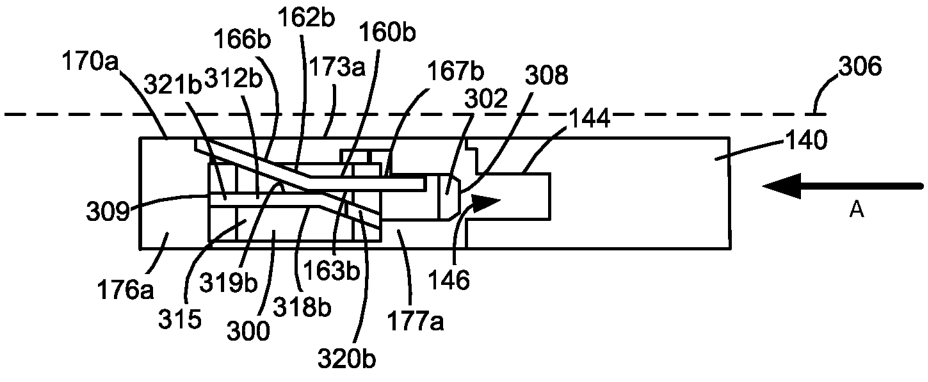
FIG. 15B is a schematic view illustrating the position of the electrical connector in the image forming device relative to the electrical connector of the toner cartridge at the position of the toner cartridge shown in FIG. 15A.

FIGS. 15A and 15B show the position of electrical connector 300 relative to electrical connector 140 as toner cartridge 100 nears the operative position of toner cartridge 100 in image forming device 22. As toner cartridge 100 advances to the position shown in FIGS. 15A and 15B, inside surfaces 163*a*, 163*b* of front portions 166*a*, 166*b* of guides 160*a*, 160*b* slide past outside surfaces 319*a*, 319*b* of leading portions 320*a*, 320*b* of guide wings 312*a*, 312*b* until inside surfaces 163*a*, 163*b* of rear portions 167*a*, 167*b* of guides 160*a*, 160*b* make contact with outside surfaces 319*a*, 319*b* of trailing portions 321*a*, 321*b* of guide wings 312*a*, 312*b*. As toner cartridge 100 continues to advance, inside surfaces 163*a*, 163*b* of rear portions 167*a*, 167*b* of guides 160*a*, 160*b* slide along outside surfaces 319*a*, 319*b* of trailing portions 321*a*, 321*b* of guide wings 312*a*, 312*b*. Inside surfaces 163*a*, 163*b* of rear portions 167*a*, 167*b* of guides 160*a*, 160*b* maintain the side-to-side alignment of male plug 302 of electrical connector 300 with socket 144 of electrical connector 140.

Figure 16A:
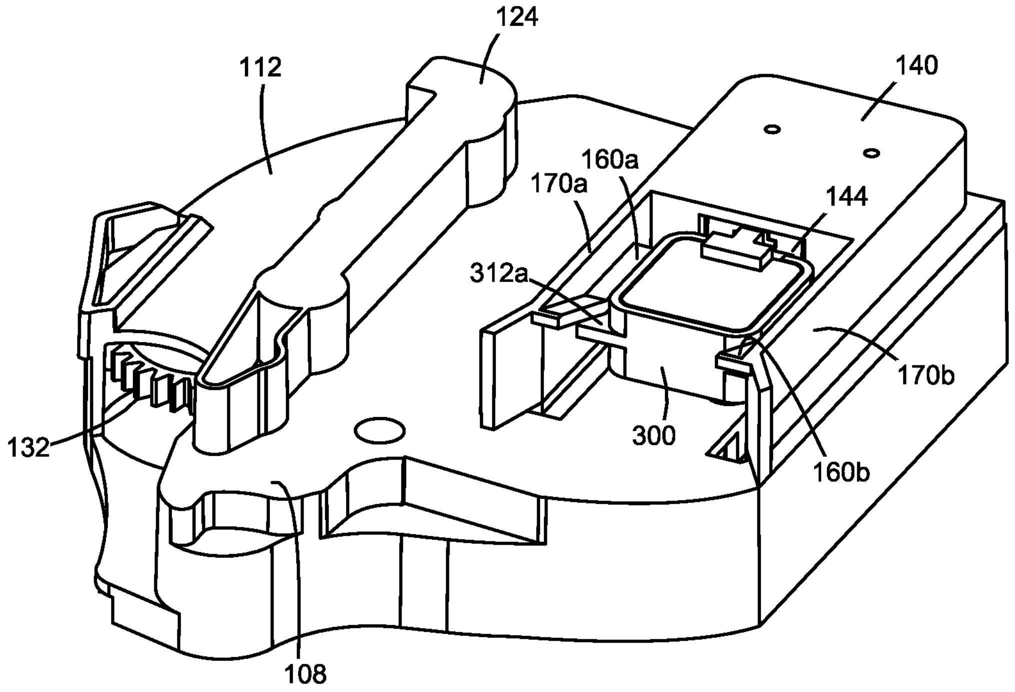
FIG. 16A is a perspective view of the end cap of the toner cartridge showing the position of the electrical connector of the toner cartridge shown in FIGS. 6-8 relative to the electrical connector in the image forming device shown in FIGS. 10-12 when the toner cartridge is fully installed in the image forming device according to one example embodiment.
Figure 16B:
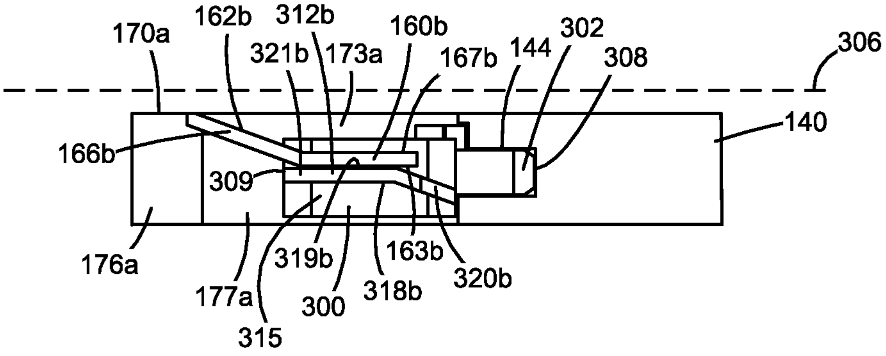
FIG. 16B is a schematic view illustrating the position of the electrical connector in the image forming device relative to the electrical connector of the toner cartridge at the position of the toner cartridge shown in FIG. 16A.

FIGS. 16A and 16B show the final operative positions of electrical connector 300 and electrical connector 140 when toner cartridge 100 is fully installed in image forming device 22. When toner cartridge 100 is at the position shown in FIGS. 16A and 16B, electrical connector 300 is in the position shown in FIG. 11. Male plug 302 of electrical connector 300 is positioned inside of pocket 146 of socket 144 of electrical connector 140 with electrical contacts 304 in contact with electrical contacts 142. The contact between electrical contacts 304 and electrical contacts 142 facilitates communication between controller 28 of image forming device 22 and processing circuitry 45 of toner cartridge 100. In the embodiment illustrated, the final position of toner cartridge 100 along the direction of insertion of toner cartridge 100 into image forming device 22 is tightly controlled in order to ensure that male plug 302 of electrical connector 300 is aligned in the front-to-rear dimension of housing 102 with socket 144 of electrical connector 140.

This sequence is reversed when toner cartridge 100 is removed from image forming device 22. Male plug 302 of electrical connector 300 withdraws from socket 144 of electrical connector 140. Electrical connector 300 is guided by side guides 160 and vertical guides 170 as toner cartridge 100 moves opposite its insertion direction. Inside surfaces 163*a*, 163*b* of front portions 166*a*, 166*b* of guides 160*a*, 160*b* slide along outside surfaces 319*a*, 319*b* of leading portions 320*a*, 320*b* of guide wings 312*a*, 312*b* as the bias applied to electrical connector 300 pulls electrical connector 300 back toward frame 306 and away from side 108 of toner cartridge 100. Inside surfaces 163*a*, 163*b* of front portions 166*a*, 166*b* of guides 160*a*, 160*b* then disengage from outside surfaces 319*a*, 319*b* of leading portions 320*a*, 320*b* of guide wings 312*a*, 312*b* allowing electrical connector 300 to return to its biased position shown in FIG. 10 where electrical connector 300 is more protected from damage.

With reference back to FIG. 8, in some embodiments, socket 144 of electrical connector 140 is movable to a limited degree along the front-to-rear dimension of housing 102 in order to allow for deviation in the final position of toner cartridge 100 in image forming device 22 along the direction of insertion A. For example, in the embodiment illustrated, socket 144 is mounted on a plate 180 positioned on the inner side of end cap 112. Plate 180 is free to move along the front-to-rear dimension of housing 102. For example, in the embodiment illustrated, plate 180 includes a pair of elongated slots 182*a*, 182*b* that each receive a post, such as a screw 183*a*, 183*b*, fixedly positioned on the inner side of end cap 112. The elongated shapes of slots 182*a*, 182*b* permit plate 180 to move forward and rearward relative to end cap 112 with screws 183*a*, 183*b* positioned therein. The engagement between screws 183*a*, 183*b* and slots 182*a*, 182*b* limits the forward and rearward travel of plate 180 relative to end cap 112. Plate 180 and, in turn, socket 144 are biased forward toward front 110 of housing 102. For example, in the embodiment illustrated, plate 180 includes a pair of flexible legs 184*a*, 184*b* composed of a resilient material, such as a resilient plastic, and positioned against a rear wall 186 on the inner side of end cap 112. However, any suitable biasing member may be used. If toner cartridge 100 continues to travel in its direction of insertion A after socket 144 of electrical connector 140 has fully received male plug 302 of electrical connector 300 during insertion of toner cartridge 100 into image forming device 22, plate 180 and socket 144 move rearward relative to housing 102 as a result of the force on socket 144 from male plug 302 causing legs 184*a*, 184*b* to flex against rear wall 186. Once toner cartridge 100 reaches its final position in image forming device 22, the bias applied to plate 180 and socket 144 by legs 184*a*, 184*b* ensures that male plug 302 remains fully inserted in socket 144 thereby aiding in controlling the alignment of male plug 302 of electrical connector 300 with socket 144 of electrical connector 140 in the front-to-rear dimension of housing 102.

Although the example embodiments discussed above include an electrical connector, such as electrical connector 140 or 140', positioned on toner cartridge 100, it will be appreciated that an electrical connector having positioning features like side guides 160*a*, 160*b* and vertical guides 170*a*, 170*b* may be used on any replaceable unit of image forming device 22, such as, for example, imaging unit 200 and/or fuser 37 in order to establish communication between controller 28 and processing circuitry 44 and/or processing circuitry 46. Further, although the example embodiment shown in FIG. 2 includes a pair of replaceable units in the form of toner cartridge 100 and imaging unit 200, it will be appreciated that the replaceable unit(s) of image forming device 22 may employ any suitable configuration as desired. For example, in one embodiment, the main toner supply for image forming device 22, developer unit 202, and cleaner unit 204 are housed in one replaceable unit. In another embodiment, the main toner supply for image forming device 22 and developer unit 202 are provided in a first replaceable unit and cleaner unit 204 is provided in a second replaceable unit. Further, although the example image forming device 22 discussed above includes one toner cartridge 100 and corresponding imaging unit 200, in the case of an image forming device configured to print in color, separate replaceable units may be used for each toner color needed. For example, in one embodiment, the image forming device includes four toner cartridges and four corresponding imaging units, each toner cartridge containing a particular toner color (e.g., black, cyan, yellow and magenta) and each imaging unit corresponding with one of the toner cartridges to permit color printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A replaceable unit for an electrophotographic image forming device, comprising:

a housing having a front and a rear positioned between a first exterior side and a second exterior side of the housing, the front of the housing is positioned to lead during insertion of the replaceable unit into the image forming device and the rear of the housing is positioned to trail during insertion of the replaceable unit into the image forming device, the housing has a reservoir for holding toner;

an electrical contact on the housing for contacting a corresponding electrical contact in the image forming device when the replaceable unit is installed in the image forming device, the electrical contact of the replaceable unit is electrically connected to processing circuitry positioned on the replaceable unit; and a guide on the first exterior side of the housing positioned in front of the electrical contact of the replaceable unit and leading rearward toward the electrical contact of the replaceable unit, the guide includes a guide surface that is angled inward in a direction from the front to the rear permitting contact between the guide surface and an electrical connector in the image forming device to move the electrical connector in the image forming device toward the replaceable unit during insertion of the replaceable unit into the image forming device with the front of the housing leading.

2. The replaceable unit of claim 1, wherein the electrical contact of the replaceable unit is positioned within a pocket on the housing, the pocket includes a frontward facing opening permitting the electrical connector in the image forming device to enter the pocket when the replaceable unit is installed in the image forming device.

3. The replaceable unit of claim 1, wherein the guide surface includes a first guide surface and a second guide surface, the first guide surface is spaced from the second guide surface with a gap between the first guide surface and the second guide surface.

4. The replaceable unit of claim 1, further comprising a vertical guide on the first exterior side of the housing positioned in front of the electrical contact of the replaceable unit and leading rearward toward the electrical contact of the replaceable unit, the vertical guide includes a vertical guide surface that is angled relative to a vertical dimension of the replaceable unit in the direction from the front to the rear permitting contact between the vertical guide surface and the electrical connector in the image forming device to move the electrical connector in the image forming device in the vertical dimension of the replaceable unit during insertion of the replaceable unit into the image forming device with the front of the housing leading.

5. A replaceable unit for an electrophotographic image forming device, comprising:

a housing having a front and a rear, the front of the housing is positioned to lead during insertion of the replaceable unit into the image forming device and the rear of the housing is positioned to trail during insertion of the replaceable unit into the image forming device, the housing has a reservoir for holding toner;

an electrical contact on the housing for contacting a corresponding electrical contact in the image forming device when the replaceable unit is installed in the image forming device, the electrical contact of the replaceable unit is electrically connected to processing circuitry positioned on the replaceable unit;

a guide on an exterior portion of the housing positioned in front of the electrical contact of the replaceable unit and leading rearward toward the electrical contact of the replaceable unit, the guide includes a guide surface that is angled inward in a direction from the front to the rear permitting contact between the guide surface and an electrical connector in the image forming device to move the electrical connector in the image forming device toward the replaceable unit during insertion of the replaceable unit into the image forming device with the front of the housing leading; and a vertical guide on the exterior portion of the housing positioned in front of the electrical contact of the replaceable unit and leading rearward toward the electrical contact of the replaceable unit, the vertical guide includes a vertical guide surface that is angled relative to a vertical dimension of the replaceable unit in the direction from the front to the rear permitting contact between the vertical guide surface and the electrical connector in the image forming device to move the electrical connector in the image forming device in the vertical dimension of the replaceable unit during insertion of the replaceable unit into the image forming device with the front of the housing leading.

6. The replaceable unit of claim 5, wherein the electrical contact of the replaceable unit is positioned within a pocket on the housing, the pocket includes a frontward facing opening permitting the electrical connector in the image forming device to enter the pocket when the replaceable unit is installed in the image forming device.

* * * * *